US007436822B2

(12) United States Patent
Lee et al.

(10) Patent No.: US 7,436,822 B2
(45) Date of Patent: Oct. 14, 2008

(54) METHOD AND APPARATUS FOR THE ESTIMATION OF TOTAL TRANSMISSION DELAY BY STATISTICAL ANALYSIS OF CONVERSATIONAL BEHAVIOR

(75) Inventors: Minkyu Lee, Ringoes, NJ (US); James William McGowan, Whitehouse Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1220 days.

(21) Appl. No.: 10/457,104

(22) Filed: Jun. 9, 2003

(65) Prior Publication Data

US 2004/0247112 A1     Dec. 9, 2004

(51) Int. Cl.
*H04L 12/66* (2006.01)
(52) U.S. Cl. ...................................... 370/356
(58) Field of Classification Search ............... None
See application file for complete search history.

(56) References Cited

U.S. PATENT DOCUMENTS 5,148,429 A * 9/1992 Kudo et al. ................. 370/473
6,907,030 B1 * 6/2005 Bladsjo et al. .............. 370/349

OTHER PUBLICATIONS

Vemuru et al, "A Model for Deal y Evaluation of a CMOS Inverter", 1990, IEEE Int. Sym. on Circuits and Systems, 1990, May 1-3, 1990, pp. 89-92, vol. I.*

Stern et al, "A Model for Generating On-Off Patterns in Conversational Speech, Including Short Silence Gaps and the Effects of Interaction between Parties", 1994, IEEE Trans. on Vehicular Technology, vol. 43, No. 4, Nov. 1994.*

ITU-T/G.107. *The E-Model, a computational model for use in transmission planning.* Mar. 2003.

ITU-T/G.114. *One-way transmission time.* Mar. 2003.

ITU-T/P.561. *In-service non-intrusive measurement device—Voice service measurements.* Jul. 2002.

P. Brady, "*A Statistical Analysos of On-Off Patterns in 16 Conversations*," The Bell System Technical Journal, Jan. 1968, pp. 73-91.

P. Brady, "*Effects of Transmission Delay on Conversational Behavior on Echo-Free Telephone Circuits*," The Bell System Technical Journal, Jan. 1971, pp. 115-134.

P. Brady, "*A Technique For Investigating On-Off Patterns of Speech*," The Bell System Technical Journal, Jan. 1965, pp. 1-22.

* cited by examiner

*Primary Examiner*—Ramnandan Singh
(74) *Attorney, Agent, or Firm*—Kenneth M. Brown

(57) ABSTRACT

A method and apparatus for estimating transmission delay across a telecommunications network by performing a statistical analysis of conversational, behavior in the network. Certain characteristic events associated with conversational behavior (such as, for example, alternative silence events, double-talk events, talk-spurt events and pause in isolation events) are identified and measured. Then, based on the proportion of time that these events occur, an estimate of the delay is calculated using a predetermined equation. Illustratively, the equation is a linear regression equation which has been determined experimentally.

20 Claims, 3 Drawing Sheets

METHOD AND APPARATUS FOR THE ESTIMATION OF TOTAL TRANSMISSION DELAY BY STATISTICAL ANALYSIS OF CONVERSATIONAL BEHAVIOR

FIELD OF THE INVENTION

The present invention relates generally to the field of telecommunications networks for use in speech transmission and the determination of Quality of Service (QoS) measures therefor, and more particularly to a method and apparatus for estimating total transmission delays across such networks based on a statistical analysis of conversational behavior.

BACKGROUND OF THE INVENTION

It is often necessary for telecommunications network carriers to guarantee (or at least to be able to measure) a Quality-of-Service (QoS) level to (or for) its customers. One important aspect of a QoS measure is the total transmission delay— i.e., the delay from the speaker's mouth to the listener's ear, or equivalently, from the speaker's microphone to the listener's loudspeaker—across the network. Identifying problems with excessive transmission delay becomes particularly important when the network includes a packet-based IP (Internet Protocol) network—that is, where the telecommunications system comprises a Voice-over-IP (VoIP) design, where delays can be highly variable and traffic dependent.

Specifically, reliable estimates of total transmission (i.e., end-to-end) delays are often needed by telecommunications service providers for a number of reasons, such as, for example, (1) to perform a general assessment of network health for long-term provisioning and management, (2) to perform active call monitoring to ensure proper network operation, and possibly (3) to guarantee any QoS obligations made to end users, including that of a single "toll quality" category (which is typically made to all users). In addition, delay measurements are often needed by telecommunications equipment providers (4) to guarantee that contractual obligations are being met with respect to network performance using either existing standards such as the "e-model" (ITU-T/G.107) or other such similar devices, or (5) to determine delay budgets either dynamically during use or at design time. (ITU-T/G.107, which is also known as the "e-model," is a well known standard promulgated by the International Telecommunications Union standards body and is fully familiar to those of ordinary skill in the art.) Additionally, (6) software products can be designed to allow dynamic adjustment of QoS parameters by assessing delay at the end-point. For example, when a PC-based (Personal Computer based) telephony application can assess delay on a per-call basis, it can then trade off delay requirements for bandwidth by adjusting the packetization rate on its transmitting channel and/or trade off packet loss for delay on its receiving channel.

Currently, there are three general methods for assessing the transmission delay which have typically been employed:

1) In a VoIP network design, IP header information may be used to calculate delay on the IP portion of the network. However, such techniques cannot assess the majority of various delay components that make up the total end-to-end delay in a complete system and as such, are not suitable for use in a QoS scheme. (This is true even for IP-terminal to IP-terminal networks.) Note that in many cases, the IP network contributes less than 10% of the overall delay, including the critical jitter buffer delay necessary on all VoIP calls.

2) A test signal or "probe" may be sent across the network. However, the use of this approach adds traffic to the network, and, moreover, it cannot measure the delays on actual customer connections. In addition, both ends of the network are often not under common service provider control—that is, one would need to control the terminals to get an accurate picture of the delay introduced by these devices, and it is typically not possible for a given service provider to introduce such a probe at an arbitrary terminal. Even if it were, probe-based measurements are insufficient because call delay cannot be determined for any arbitrary channel during any arbitrary time, and cannot account for variation in delay from terminal to terminal (which may in many cases account for the majority of total delay).

3) Recommendation ITU-T/P.561 suggests that "double-talk"—the situation in which both parties in a conversation talk simultaneously—can be used as an indicator of the existence of unacceptable delay. (ITU-T/P.561 is a recommendation promulgated by the International Telecommunications Union standards body and is fully familiar to those of ordinary skill in the art.) This results from the recognition that when excessive transmission delays are present, people naturally tend to talk over one another. Unfortunately, this approach provides merely a "litmus test" or true/false test for whether the transmission delay exceeds some threshold of acceptability (i.e., that which results in double-talk), and does not provide an indicator of the amount of delay. In addition, most echo cancellers, provided in many telecommunications network environments, interfere with (i.e., prevent the occurrence of) double-talk by switching to a half-duplex transmission mode when double-talk is detected.

Therefore, it would be highly advantageous if the total transmission delay across a telecommunications network used for speech transmission could be estimated without the limitations or disadvantages of the prior art techniques.

SUMMARY OF THE INVENTION

We have recognized that the conversational behavior of talkers (or of protocols in cases involving machine communication) can be advantageously analyzed to determine an estimate of total end-to-end transmission delay in a telecommunications network. In particular, it has been observed that while double-talk typically occurs when the total (one-way) end-to-delay exceeds approximately 400 milliseconds (ms), people will in general accommodate moderately long delays (e.g., those between 150 ms and 400 ms) by purposefully avoiding double-talk—thus, the "unacceptability" threshold actually begins at about 150 ms in a conversation, and adjusts upward as needed. As such, we have recognized, for example, that alternative silence—the delay observed when the conversation alternates from one person talking to the other—is reasonably indicative of actual end-to-end delays, since people will usually accommodate the transmission delay by adding the necessary amount of alternative silence needed to sustain regular conversational turn-taking.

Thus, in accordance with the present invention, a method and apparatus is provided in which certain characteristic events associated with conversational behavior (such as, for example, alternative silence events, pause in isolation events, double-talk events and talk-spurt events) are identified and measured, and then, based on a proportion of time that these events occur, an estimate of the transmission delay across a telecommunications network is computed. Illustratively, the estimate of the transmission delay may be computed using a predetermined equation, and this equation may be a linear regression equation which has been determined experimentally.

Advantageously, in accordance with certain illustrative embodiments of the present invention, end-to-end delay can be estimated from any arbitrary single point in the network, can be accomplished non-intrusively on any arbitrary conversation, and can account for all sources of delay including networks not under the service provider's control and the specific terminals used on the call. For example, in accordance with one illustrative embodiment of the present invention, a single network switch offers delay measurement as a feature (as opposed to delay being measured by a system-level product, as in certain prior art approaches).

DETAILED DESCRIPTION

Figure 1:
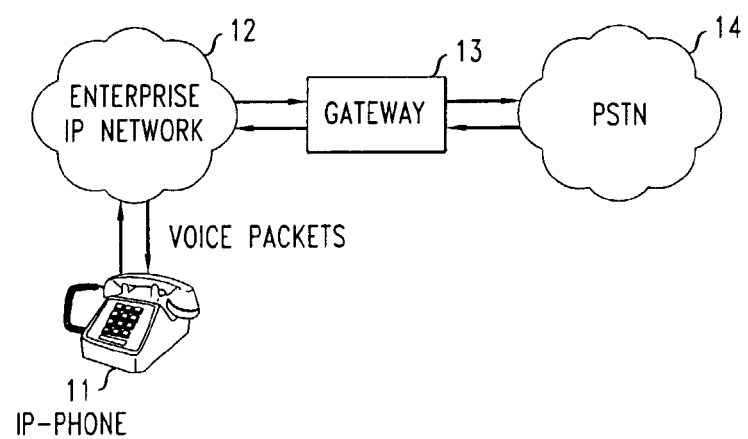
FIG. 1 shows an illustrative telecommunications network configuration for Voice-over-IP.

FIG. 1 shows a block diagram of an illustrative VoIP network configuration in which voice traffic on a local IP network (e.g., an "enterprise" network) is transmitted in packets. In particular, the illustrative network configuration comprises IP-phone 11 which transmits and/or receives voice packets to and from Enterprise IP network 12, as well as gateway 13 which provides an interface between Enterprise IP network 12 and Public Switched Telephone Network (PSTN) 14.

Note specifically that there are several additional sources of delay in a packet-based network, particular in a VoIP network, that are not found in a typical circuit-switched network (i.e., those most commonly employed by traditional telephone communication service providers). In particular, in the network of FIG. 1, the total transmission delay is the sum of the (a) compression/decompression delays (e.g., speech coding/decoding delays), (b) processing delay, (c) buffering delays, (d) transmission delay, and (e) network delay, as well as (f) other possible sources. The network delay is variable (depending, for example, on network traffic conditions), while the others can either (a) be "fixed" during the network design stage, (b) vary from call-to-call, (c) vary by terminal or access location, or (d) vary within a call due to, for example, adaptive buffering.

In accordance with the principles of the present invention, the total end-to-end transmission delay may be advantageously determined based on a statistical analysis of the conversational behavior between two speakers. In particular, for human talkers, as many as ten identifiable "events" may be defined based on the on-off patterns in a telephone conversation between two speakers—designated here as speaker A and speaker B, as follows:

1. Talk-spurt—a period when speech is present from either speaker A or B;

2. Pause—a period when silence is present from either speaker A or B;

3. Double talk—a period when speech is present from both speaker A and B;

4. Mutual silence—a period when silence is present from both speaker A and B;

5. Alternative silence—a mutual silence between the end of one speaker's talk-spurt and the beginning of the other speaker's talk-spurt (a subset of #4);

6. Pause in isolation—a pause in which the other speaker is silent throughout the pause (a subset of #2 and #4);

7. Solitary talk-spurt—a talk-spurt in which the other speaker is silent throughout the talk-spurt (a subset of #1);

8. Interruption—speaker A's talk-spurt when speaker A interrupts speaker B;

9. Speech after interruption—the remainder of speaker B's talk-spurt after the interruption; and 10. Speech before interruption—speaker B's talk-spurt up to the interruption.

Figure 2:
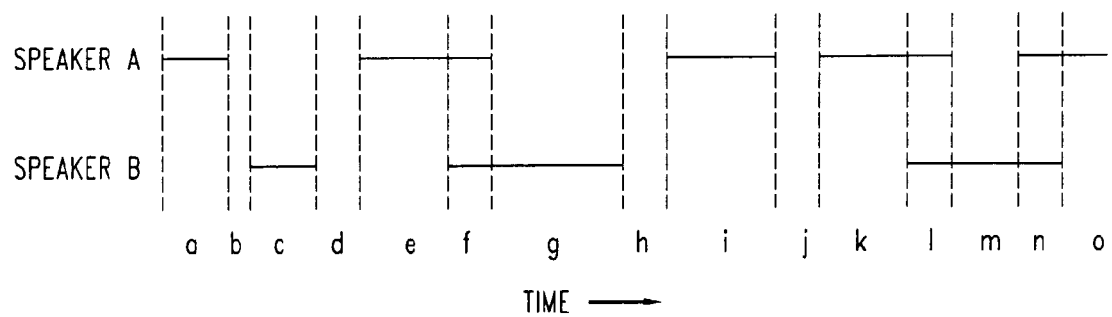
FIG. 2 shows an illustrative example of the on-off pattern of a typical conversation.

FIG. 2 shows an illustrative example of the on-off pattern of a typical conversation. The figure shows two speakers, A and B, and a timeline divided into time segments (a) through (o). As can be seen from the figure, for example, time segments (f), (l) and (n) comprise double talk; time segments (b), (d), (h) and (j) comprise mutual silence; and time segments (b), (d) and (h) comprise alternative silence.

It has also been noted that speakers tend to make certain adjustments in their speaking behavior based on the presence of transmission delays. Among the ten events listed above, double talk events, mutual silence events and, especially, alternative silence events are those which tend to be most affected by the conversational behavior changes introduced as a result of transmission delay. Therefore, in accordance with certain illustrative embodiments of the present invention, the transmission delay may be advantageously estimated by analyzing the statistical pattern of these events.

More specifically, in accordance with an illustrative embodiment of the present invention, the transmission delay may be advantageously estimated with use of a linear regression equation. In particular, this regression equation is representative of a relationship between transmission delay and the percentage of time that each of the events of interest (e.g., double talk events, talk-spurt events, pause in isolation events, and alternative silence events) are present. The regression equation may be determined in any of a number of ways, bit according to one illustrative embodiment of the present invention, may be derived with use of an experimental setup in which artificial delays are advantageously introduced in an otherwise low-delay communications network.

Figure 3:
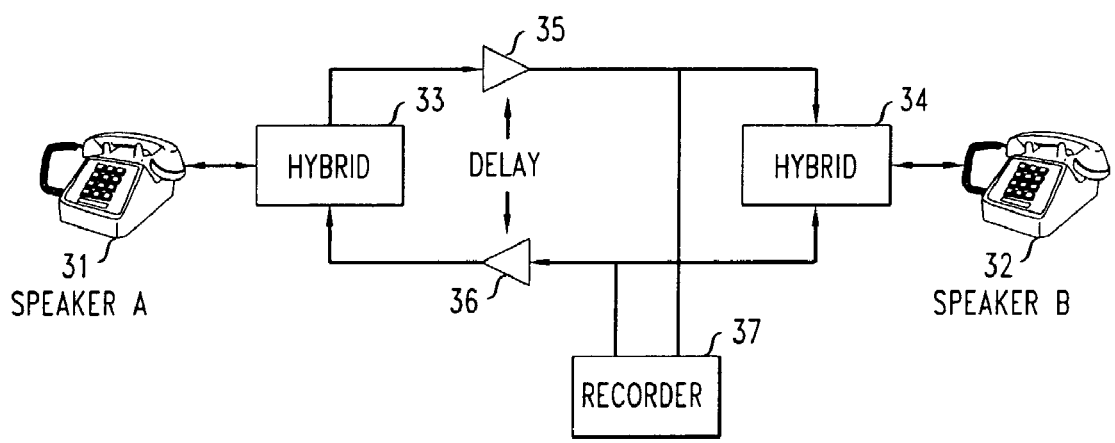
FIG. 3 shows an illustrative experimental setup for deriving linear regression equations for use in an illustrative embodiment of the present invention.

FIG. 3 shows an illustrative experimental setup for deriving such linear regression equations for use in an illustrative embodiment of the present invention. The setup includes speaker A terminal 31 and speaker B terminal 32, corresponding hybrids 33 and 34, respectively, delay 35 for introducing delay in the transmission from speaker A terminal 31 to speaker B terminal 32, delay 36 for introducing delay in the transmission from speaker B terminal 32 to speaker A terminal 31, and recorder 37, which is attached to a common point along the two transmission paths.

In the operation of the illustrative setup of FIG. 3, voice transmission is entered at one terminal and artificially delayed before reaching the other end in order to simulate an actual transmission delay. The amount of delay can be advantageously controlled and dynamically adjusted. A two-way conversation (between users of terminal 31 and 32) can be recorded for further processing, which processing advantageously makes use of a voice activity detector (VAD) which identifies the timing of various events (e.g., double talk events, talk-spurt events, pause in isolation events and alternative silence events) as described above. Any type of conventional voice activity detector (VAD), fully familiar to those of ordinary skill in the art, can be used for detecting voice activity from the recording. Finally, based upon the identified events and their timing, the percentages of double talk time, talk-spurt time, pause in isolation time and alternative silence time (as compared to the total elapsed time) can each be calculated.

The above described "experiment" can be repeated with different delay parameters and for different speaker pairs. (Note that as transmission delay increases, the percentage of double talk time, talk-spurt time, pause in isolation time, and alternative silence time will also invariably increase.) In accordance with an illustrative embodiment of the present invention, a linear regression equation can then be advantageously derived. Specifically, the following regression equation may be derived from the illustrative setup experiment described above:

$$Y=aX+b,$$

where Y is the percentage of an event (such as, for example, double-talk time) and X is the delay parameter for the experiment. The slope, a, and the intercept, b, can be calculated as follows:

$$a = \frac{SC_{xy}}{SS_x}$$

and $b=M_y-aM_x$, where, $SS_x$ is the raw measure of the variability among the values of $X_i$; $SC_{xy}$ is the raw measure of the co-variability of X and Y together; and $M_x$ and $M_y$ are the average of x and y, respectively. As can be seen, this regression equation is representative of the relationship between the transmission delay and the percentages of double talk time, talk-spurt time, pause in isolation time and alternative silence time (as compared to the total elapsed time).

Figure 4:
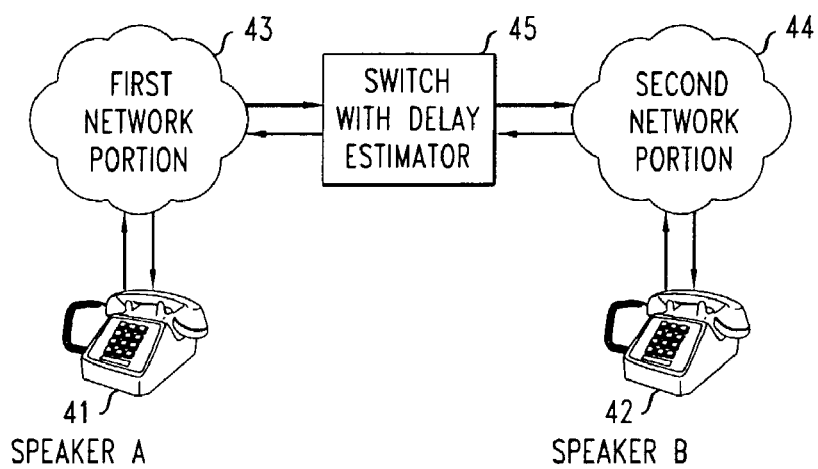
FIG. 4 shows an illustrative telecommunications network which includes an apparatus for estimating a network transmission delay in accordance with an illustrative embodiment of the present invention.

FIG. 4 shows an illustrative telecommunications network which includes an apparatus for estimating a network transmission delay in accordance with an illustrative embodiment of the present invention. The illustrative network includes Speaker A terminal 41 which transmits and/or receives speech to and from first network portion 43, and Speaker B terminal 42 which transmits and/or receives speech to and from second network portion 44, as well as switch 45 interposed between first network portion 43 and second network portion 44. In particular, and in accordance with the illustrative embodiment of the present invention, switch 45 includes a delay estimator for estimating a total end-to-end transmission delay in accordance with the principles of the present invention. More particularly, switch 45 monitors (non-intrusively) both ends of the conversation between Speaker A and Speaker B as communication therebetween passes between first network portion 43 and second network portion 44. (In other illustrative embodiments of the present invention, switch 45 may be disposed at any other point in the network, or, for that matter, in between the network and one or more terminals, as long as it is located at a place where it can monitor both ends of a conversation as the speech or data representative thereof passes therethrough.)

Figure 5:
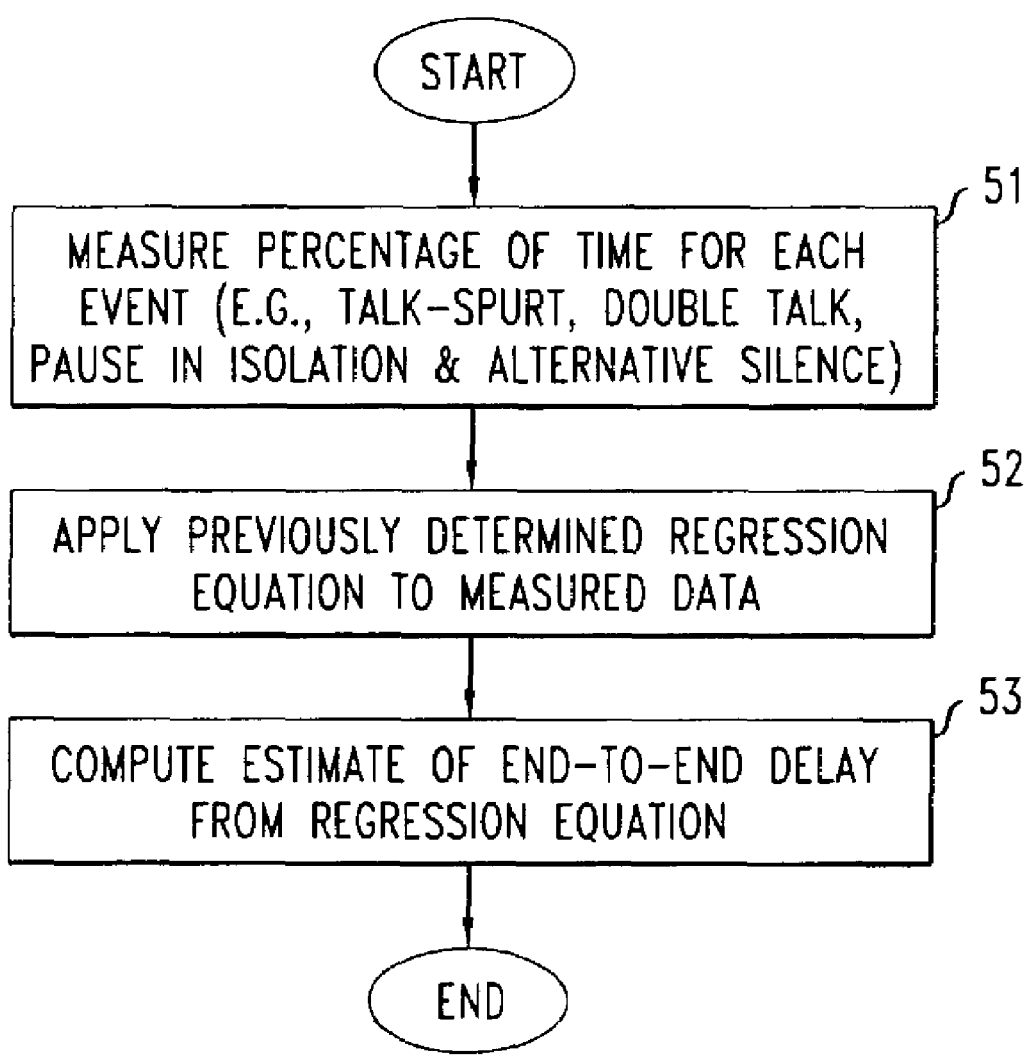
FIG. 5 shows an illustrative flowchart of a method for estimating a network transmission delay in accordance with an illustrative embodiment of the present invention.

FIG. 5 shows an illustrative flowchart of a method for estimating a network transmission delay in accordance with an illustrative embodiment of the present invention. The illustrative method, which operates on a call in progress, monitors both "directions" of the call and thereby identifies certain ones of the above-described "events". In particular, and as shown in block 51 of the illustrative flowchart of FIG. 5, the proportion of time for each of talk-spurt events, double talk events, pause in isolation events and alternative silence events is measured. As shown in block 52, the (predetermined) regression equation is applied to the measured data, and as shown in block 53, an estimate of the total end-to-end transmission delay (within some error boundary) is advantageously computed from the regression equation.

In accordance with one illustrative embodiment of the present invention, the equation used in FIG. 5 to compute the estimate of the transmission delay may be:

$$D=400+(4*AS)-(1*PI)+(15*DT)-(3*TS),$$

where D is the transmission delay estimate; AS is the proportion of time of alternative silence events; PI is the proportion of time of pause in isolation events; DT is the proportion of time of double talk events; and TS is the proportion of time of talk-spurt events. Note that alternatively, the above equation can be rewritten as:

$$D=400+1*(4*AS-PI)+5*(3*DT-TS),$$

illustrating that the AS/PI pair of events is advantageously weighted such that AS affects the delay estimate 4 times as much as does PI, that the DT/TS pair of events is advantageously weighted such that DT affects the delay estimate 3 times as much as does TS, and that the DT/TS pair of events affects the delay 5 times as much as does the AS/PI pair. (Clearly, the two illustrative equations shown above are mathematically identical, and can also be written in many other equivalent forms which would yield identical numerical results.)

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope.

For example, although the illustrative embodiments of the present invention described herein focus on Voice-over-IP (VoIP) telecommunication network designs, it will be obvious to those of ordinary skill in the art that the principles of the present invention can be applied to any packet-based or circuit-switched networks, both in the wireline and wireless domains. Moreover, the principles of the present invention can be applied to traditional hierarchical telecommunications networks as well as to "next generation" networks which may terminate on non-traditional devices (such as, for example, software for direct peer-to-peer communication over personal handheld computers), or to any arrangement where two-way communications might occur (including to systems not currently supported by service providers, such as citizen-band radio or any other peer-to-peer communication arrangement, again, both in the wireline and wireless domains). And finally, although the illustrative embodiments of the present invention described herein focus on the communication of human speech, it will also be appreciated by those skilled in the art that the principles of the present invention may also be applied to the interactive communication protocols involved in automated machine communications as well.

Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future— i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

We claim:

1. A method for estimating a total end-to-end transmission delay across a telecommunications network, the method comprising the steps of:
    monitoring a communication across said network between at least two parties for a time period;
    identifying one or more occurrences of one or more conversational event types in said monitored communication;
    measuring, for each of said one or more conversational event types, a corresponding one or more proportions of said time period during which each of said one or more conversational event types occurs; and
    computing said estimate of said total end-to-end transmission delay across the telecommunications network based on said one or more measured proportions of said time period.

2. The method of claim 1 wherein said step of computing said estimate of said total end-to-end transmission delay across the telecommunications network based on said one or more measured proportions of said time period comprises applying a predetermined equation to said one or more measured proportions of said time period.

3. The method of claim 2 wherein said predetermined equation comprises a linear regression equation which has been experimentally derived.

4. The method of claim 1 wherein said one or more conversational event types includes one or more event types selected from the group consisting of talk-spurt events, pause events, double talk events, mutual silence events, alternative silence events, pause in isolation events, solitary talk-spurt events, interruption events, speech after interruption events and speech before interruption events.

5. The method of claim 4 wherein said one or more conversational event types comprises alternative silence events.

6. The method of claim 5 wherein said one or more conversational event types further comprises talk-spurt, double talk and pause in isolation events.

7. The method of claim 1 wherein the step of identifying said one or more occurrences of said one or more conversational event types is performed with use of a voice activity detector.

8. The method of claim 1 wherein said telecommunications network comprises an IP packet-based network and wherein said communication across said network occurs with use of VoIP communications techniques.

9. The method of claim 1 wherein said telecommunications network further comprises a circuit-switched network.

10. The method of claim 1 wherein the step of monitoring said communication across said network is performed at a single point in said network.

11. An apparatus for estimating a total end-to-end transmission delay across a telecommunications network, the apparatus comprising:
    a probe which monitors a communication across said network between at least two parties for a time period;
    an analysis module which identifies one or more occurrences of one or more conversational event types in said monitored communication
    and which measures, for each of said one or more conversational event types, a corresponding one or more proportions of said time period during which each of said one or more conversational event types occurs; and
    a computational module which computes said estimate of said total end-to-end transmission delay across the telecommunications network based on said one or more measured proportions of said time period.

12. The apparatus of claim 11 wherein said estimate of said total end-to-end transmission delay across the telecommunications network is computed based on said one or more measured proportions of said time period by applying a predetermined equation to said one or more measured proportions of said time period.

13. The apparatus of claim 12 wherein said predetermined equation comprises a linear regression equation which has been experimentally derived.

14. The apparatus of claim 11 wherein said one or more conversational event types includes one or more event types selected from the group consisting of talk-spurt events, pause events, double talk events, mutual silence events, alternative silence events, pause in isolation events, solitary talk-spurt events, interruption events, speech after interruption events and speech before interruption events.

15. The apparatus of claim 14 wherein said one or more conversational event types comprises alternative silence events.

16. The apparatus of claim 15 wherein said one or more conversational event types further comprises talk-spurt, double talk and pause in isolation events.

17. The apparatus of claim 11 further comprising a voice activity detector, and wherein said one or more occurrences of said one or more conversational event types are identified with use of said voice activity detector.

18. The apparatus of claim 11 wherein said telecommunications network comprises an IP packet-based network and wherein said communication across said network occurs with use of VoIP communications techniques.

19. The apparatus of claim 11 wherein said telecommunications network further comprises a circuit-switched network.

20. The apparatus of claim 11 wherein said probe adapted to monitor said communication across said network is located at a single point in said network.

* * * * *